May 11, 1926.
E. C. HENDERSON
LEANING SUPPORT FOR MOTOR CYCLES AND THE LIKE
Filed Oct. 6, 1925
1,584,096
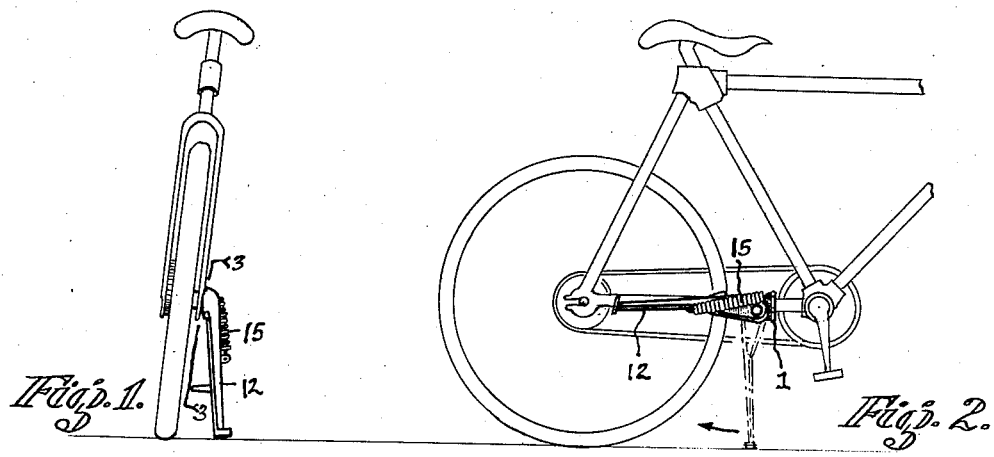
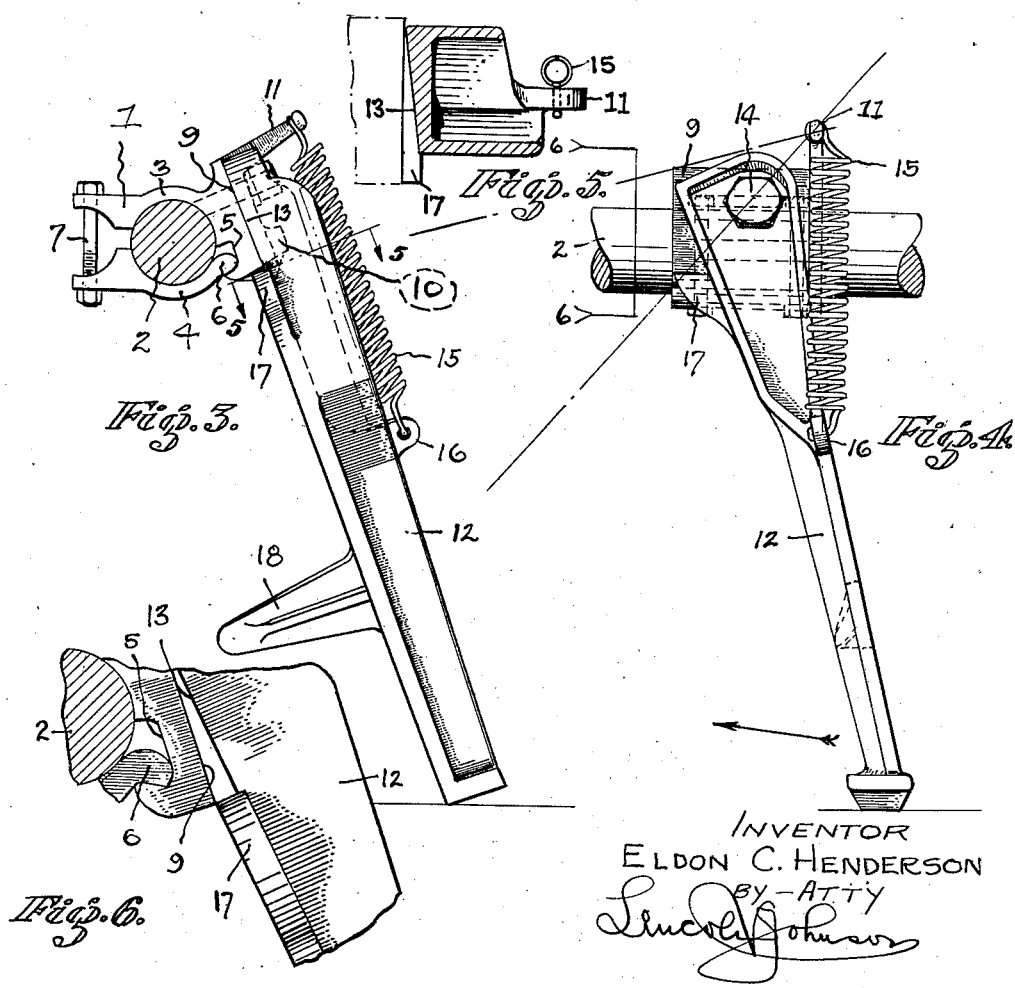
INVENTOR
ELDON C. HENDERSON
BY ATTY Patented May 11, 1926.

1,584,096

UNITED STATES PATENT OFFICE.

ELDON C. HENDERSON, OF SAN FRANCISCO, CALIFORNIA.

LEANING SUPPORT FOR MOTOR CYCLES AND THE LIKE.

Application filed October 6, 1925. Serial No. 60,879.

This invention relates to a support bar arranged on one side of a motor cycle, bicycle, or the like, to hold the same in a standing position.

An object of the invention is to provide a support bar to be mounted on one side of the frame, or other stationary structure of a two wheeled vehicle, and which is provided with means thereon to support the said vehicle in a substantially perpendicular, stationary position.

A further object of the invention is to provide a leaning support for motor cycles, bicycles, and the like, which is provided with a locking rack thereon to receive and hold the supporting member in the operative position when influenced by the weight of the vehicle in the standing position.

Other objects of the invention are to provide a bar for holding a motor cycle in a stationary position, that is provided with a positive locking means for holding the bar in an operative and extended position, and spring means for returning the said bar to an inoperative and concealed position; and to provide a single leg, for supporting a two-wheeled vehicle in an upright, stationary position, which will be superior in point of simplicity, inexpensiveness of construction, positiveness of operation and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings

Fig. 1 is an end elevation of a two-wheeled vehicle, having a single support arm mounted one one side thereof, constructed in accordance with my invention.

Fig. 2 is a fragmentary side elevation of Fig. 1.

Fig. 3 is an enlarged end view taken through Fig. 1 on the line 3—3.

Fig. 4 is a side elevation of Fig. 3.

Fig. 5 is a cross section taken through Fig. 3 on the line 5—5.

Fig. 6 is an enlarged fragmentary section taken through Fig. 4 on the line 6—6, showing the support arm lock about to become disengaged.

The majority of all motor cycles, bicycles, and other two-wheeled vehicles, are provided with a standard type of rack or stand pivoted around the axle of the rear wheel, whereby the said vehicle may be supported in an upright stationary position by means of the said rack, and when the rack is not in use, it is held in an inconspicuous position on the said vehicle. This particular form of rack is difficult to use due to the fact that the entire weight of the motorcycle must be balanced from the rear of the rear wheel, during the time that the motorcycle is being lifted onto the stand. It often happens that in lifting the rear of the motor cycle onto the stand, the same will fall over to one side or the other and cause damage to the vehicle structure. In my invention, I have pivoted a single support arm to one side of the vehicle frame, or other rigid structure, whereby, while the operator is seated thereon and balancing the vehicle in an upright position, one of the feet may be used to push the support down into the operating position so that the said vehicle may be leaned thereon. In returning the support bar to the inoperative or out of the way position, the operator uses one of the feet to start moving the support bar back, and a tension spring forces the said support bar into the final resting place and there holds it until further use of the same is desired.

In detail, the construction illustrated in the drawings comprises a bracket 1, in the form of a two part detachable clamp, that is mounted on the frame 2 of a motor cycle, bicycle, or the like. The clamp 1 is formed of a pair of interlocking complementary members 3 and 4. The member 3 has a jaw 5 therein to receive the edge 6 of the member 4, whereby the parts 5 and 6 may be joined together in interlocked relation by the connecting bolts 7. The member 3 is provided with a planar surface 9 on one side thereof, and one end of the surface 9 is provided with an upstanding lug 10 thereon, to limit and control the extent of the swinging movement of the support arm, to be hereinafter described, and with an extended leg 11 around which an end coil spring to be hereinafter described, is fastened.

A support arm or leg 12 consisting of a suitably molded metal member, is provided with a surfaced end 13 that is adapted to be held by the bolt 14 in pivotal relation with the planar surface 9 of the rack 3. The bolt 14 is passed through the end of the leg 12 and is screwed into the bracket 1 to allow a free swinging movement of the leg 12 and to also allow for a slight axial or separation motion of the surfaced end 13 of the leg 12 from the rack 1, for the purpose to be hereinafter described. A spring 15 is connected at one end to a lug 16 on the middle portion of the bar 12, while the opposite end of the spring is connected to the lug 11 on the rack 1. The end of the lug 11 is arranged off center in relation to the pivotal axis of the supporting leg 12, so that the spring may be placed under tension when the support leg is moved to either side of the "dead-center" position, formed where the axes of the support leg and spring coincide.

The spring may be utilized to hold the support leg in an operative position for supporting the vehicle upright, and for holding the said support leg in an inoperative position against the frame of the vehicle. In the form of support bar shown in my Patent No. 1,539,115, May 26, 1925, the spring is arranged to hold the support leg in both the operative and inoperative positions, in conjunction with stop lugs. In the present invention, the tension spring may be used in the same manner, although I have provided a positive locking member for the purpose of holding the support leg in the operative position. The positive lock consists of a projection 17 formed on one side of the bar 12, which said projection extends in front of the surfaced end 13 on the leg 12. The distance that the face of the projection 17 extends above the face 13 is substantially equivalent to the axial play allowed the leg 12 by the fastening bolt 14. When the support leg 12 is moved into the operative position shown in Figs. 3 and 4, the lock projection 17 is passed under the bottom edge of the planar surface 13, and the surfaces 9 and 13 lie together. The weight of the vehicle is thus transferred directly onto the support leg at the point of connection of the positive lock. The support leg 12 will remain in the operative position even when the weight of the vehicle has been removed, therefrom, the locking connection rendering the tension spring 15 inoperative to return the support leg to the inoperative position. In order to place the leg 12 into the inoperative position, the operator first moves the leg 12 axially on the pivot 14, so as to separate the engaging faces 9 and 13 and to disengage the projection 17 from the rack 1, as shown in Fig. 6. In this position, the projection 17 will ride upon the surface 9 of the rack 1, and will be in position to be swung rearwardly into the inoperative position, part way by the manual effort of the operator, and the remainder of the distance by the spring 15. In moving the leg 12 from the inoperative into the extended position, the initial movement is started by the operator until the spring 15 is placed over "dead-center", after which the spring 15 will pull the supporting leg 12 into the operative position. The lug 10 limits the extreme movement of the leg 12 while the angular position in which the leg 12 will rest, when in the operative position, is controlled by the locking projection 17. An arm 18 is provided on one face of the leg 12 adjacent the free end thereof, so as to engage the vehicle when moved into the inoperative position. Although I have shown and described means on the rack and upon the support arm to fix the limits within which radial movement of the leg 12 may take place, it is to be understood that it would be clearly within the purview of the invention to provide the said stops either on the vehicle frame, or upon the supporting leg. In the operative position the support leg 12 lies substantially parallel with the frame of the vehicle, and is in constant readiness to be swung downwardly and outwardly into an operative position for supporting the vehicle substantially upright. Furthermore, I have shown the invention in an integral form, and I wish it to be understood that my invention clearly contemplates a structure in which the support leg 12 is pivoted onto the vehicle frame in some suitable manner, and provided with a positive lock to hold the support leg in the extended position, and has a spring connected to some part of the vehicle frame, and to the leg, for holding the said support leg in either the operative or inoperative positions. This latter construction is accomplished by using the same elements as are found in my invention, but by assembling same in the vehicle in detached relationship.

Having thus described this invention, what I now claim and desire to secure by Letters Patent is:

1. A device, such as described, comprising a bracket attachable to the frame of a bicycle; a single support arm pivoted to said bracket; a spring connected to the said support arm and bracket to hold said arm against the frame in an inoperative position; and coacting locking means on the bracket and arm, to hold the support arm in an operative position at an angle to the frame to support the bicycle in a substantially vertical leaning position.

2. A device such as described comprising a bracket attachable to the frame of a bicycle; a single support arm pivoted to said bracket, said arm being adapted to lie in an inoperative position against the bicycle frame and in an operative position at an angle to the bracket to support the bicycle in a substantially vertical leaning position; a spring to hold the support arm in the inoperative position; and a shouldered rack to receive the support arm and to hold said support arm in the operative position.

3. A device such as described comprising a bracket attachable to the frame of a bicycle; a single support arm pivoted to said bracket, said arm being adapted to lie in an inoperative position against the bicycle frame and in an operative position at an angle to the bracket to support the bicycle in a substantially vertical leaning position; a spring secured at its opposite ends to the bracket and support arm, respectively, to hold the said support arm in the operative and inoperative positions; and a shouldered rack to receive the support arm and to position said support arm in the operative position.

4. A device such as described comprising a bracket attachable to the frame of a bicycle; a single support arm pivoted to said bracket; a spring related to said arm to hold said arm in an inoperative position against the bicycle frame and an operative position at substantially a vertical angle to the bracket; a projection on the arm to engage the bicycle frame in the inoperative position; and coengaging faces on the bracket and support arm adapted to be detachably locked together when the arm is in the operative position.

5. A motorcycle side stand comprising a bearing on the cycle frame; a manually movable support leg pivotally journaled on said bearing to swing out from one side of the cycle frame into an operative position to support the cycle in a substantially vertical position; a spring and stops on the bearing co-acting with the support leg to hold the support leg in operative and inoperative positions; and an auxiliary locking member to hold the support leg in the operative position independently of the stops.

In testimony whereof, I have hereunto set my hand at San Francisco, California, this 30th day of September, 1925.

ELDON C. HENDERSON.